United States Patent [19]

Brauer et al.

[11] 4,224,164

[45] Sep. 23, 1980

[54] NON-WICKING POLYURETHANE CASTING SYSTEMS

[75] Inventors: Melvin Brauer, East Brunswick; Barton C. Case, Howell; Thaddeus F. Kroplinski, Bound Brook, all of N.J.

[73] Assignee: NL Industries, Inc., New York, N.Y.

[21] Appl. No.: 953,112

[22] Filed: Oct. 20, 1978

Related U.S. Application Data

[60] Division of Ser. No. 890,212, Mar. 27, 1978, abandoned, which is a continuation-in-part of Ser. No. 741,275, Nov. 12, 1976, abandoned.

[51] Int. Cl.$^2$ ............................................. B01D 31/00
[52] U.S. Cl. ............................... 210/321 B; 210/323 T
[58] Field of Search ......... 422/48; 210/493 R, 321 R, 210/321 A, 321 B, 323 T, 23 F, 433 M; 260/75 NQ, 77.5 AQ, 18 TN

[56] References Cited

U.S. PATENT DOCUMENTS

| | | | |
|---|---|---|---|
| 3,049,514 | 8/1962 | Damusis | 260/77.5 AQ |
| 3,245,849 | 4/1966 | Klager et al. | 260/77.5 AQ |
| 3,252,848 | 5/1966 | Borbellino | 260/77.5 TB |
| 3,345,311 | 10/1967 | Ehrlich et al. | 260/18 |
| 3,362,921 | 1/1968 | Ehrlich | 260/18 |
| 3,424,701 | 1/1969 | Kwawa | 260/77.5 AM |
| 3,427,366 | 2/1969 | Verdol et al. | 260/859 |
| 3,483,150 | 12/1969 | Ehrlich | 260/18 |
| 3,870,683 | 3/1975 | Freure et al. | 260/75 NT |
| 3,962,094 | 6/1976 | Davis et al. | 210/321 R |
| 4,125,545 | 11/1978 | Kroplinski et al. | 260/18 TN |

OTHER PUBLICATIONS

"Membrane Ultrafiltration", M. C. Porter et al., Chem. Tech., Jan., 1971, pp. 56-63.

*Primary Examiner*—Charles N. Hart
*Assistant Examiner*—David R. Sadowski
*Attorney, Agent, or Firm*—Gary M. Nath

[57] ABSTRACT

A non-wicking polyurethane casting system has been developed which comprises the reaction product obtained by admixing a polyol containing N-N-N'-N'-tetrakis (2-hydroxypropyl) ethylene diamine, (hereafter referred to as QUADROL) with an isocyanate terminated polyurethane based prepolymer. This non-wicking casting system is useful as a potting compound in biomedical applications such as dialysis and hemoultrafiltration devices and the like.

3 Claims, No Drawings

NON-WICKING POLYURETHANE CASTING SYSTEMS

This application is a divisional of U.S. patent application Ser. No. 890,212, filed Mar. 27, 1978 now abandoned which is a continuation-in-part of U.S. patent application Ser. No. 741,275, filed Nov. 12, 1976, now abandoned.

Many potting systems which have been developed in the past have been used in biomedical devices, such as the hollow-fiber artificial kidney, to form the so-called "tube sheets" and the folded membrane artificial kidney. They, however, have met with limited success. Among the resins used in these potting compounds are polyolefins, wax-extended polyolefins, polyolefin copolymers, polyamides, polystyrene, polyvinyl chloride, silicone rubbers, epoxy resins and the like. However, all the above resins have been found deficient in one aspect or another, and, therefore, it is desirable to produce a system which is more acceptable to the medical field.

Many of the above resins have long cure times which causes delays in production. Also, unless centrifical casting is used to produce the tube sheets, wicking of the polyurethane up the hollow-fibers occurs, which is very undesirable because it tends to create irregularities in the "tube sheet" which, could cause leaks, and because it reduces the surface area of the hollow-fibers. Slow curing systems and wicking of the polyurethane resin can be eliminated by the use of catalysts such as organometallic compounds or tertiary amines, however, the use of these types of catalysts in the "tube sheet" is prohibited because of their toxicity if absorbed into the blood.

We have found that we can achieve the fast cure necessary to eliminate the wicking problems without resorting to the use of viscous polyurethanes by using N-N-N'-N'-tetrakis (2-hydroxyproply) ethylene diamine as the reactive catalyst. "QUADROL" is the trademark for Wyandotte Chemical Co. for this diamine. The initial mix viscosity of the urethane system must be low in viscosity if good penetration of the urethane into the bundle of hollow-fibers is to be obtained. However, if the viscosity does not increase rapidly wicking will occur. We have found that the use of QUADROL will cause the viscosity of the urethane system to increase rapidly without markedly increasing the initial mix viscosity of the system.

Apparently QUADROL has catalytic activity due to its tertiary nitrogens. Its four hydroxyl groups react with the isocyanate chemically bonding it to the polymer structure of the urethane "tube sheet", and as such, it does not present a toxicity problem.

In the instant invention a two component system is prepared and when the two components are reacted with one another, a superior fast curing non-wicking casting system is produced which is toxicologically more acceptable.

SUMMARY OF THE INVENTION

The instant casting system comprises the reaction product produced by admixing a polyol containing QUADROL with an isocyanate terminated polyurethane based prepolymer. The ratio of equivalents of QUADROL to other polyols employed should be from 5:95 to 40:60. In general, the total polyol and isocyanate are admixed in amounts to provide an NCO/OH equivalent ratio of about 1 to 1.1:1. This reaction product produces a superior biomedically inert non-wicking casting system.

DESCRIPTION OF THE PREFERRED EMBODIMENTS

The polyols which may be employed in conjunction with QUADROL include castor oil, esters of castor oil, polyethers such as polyoxypropylene glycol and polytetramethylene glycol, homopolymers or copolymers of hydroxyl bearing butadiene, and hydroxyl bearing polyesters, such as polyethylene glycol adipate and the like and combinations thereof.

As stated above, the equivalents ratio of QUADROL to other polyols in the overall polyol used to cure the isocyanate terminated prepolymer falls within the range from 5:95 to 40:60. Accordingly, the overall polyol contains about 1 to 15 wt.%, preferably about 5 to 10 wt.%, of QUADROL with the remainder being other polyols such as castor oil, etc., described above.

The isocyanate terminated prepolymer is preferably formed from an aromatic diisocyanate such as 4-4'diphenylmethane diisocyanate (MDI), however, a cycloaliphatic diisocyanate such as 3-isocyanato methyl, 3,3,3-trimethylcyclohexyl isocyanate (IPDI) can also be employed. The useable isocyanates for making the prepolymers in this invention also include aliphatic and aromatic diisocyanates such as polymethylene polyphenylisocyanate, tolylene diisocyanate (TDI), 1,5-napthalene diisocyanate, phenylene diisocyanates, or mixtures of these materials, 4,4'-methylene bis (cyclohexyl isocyanate) and hexamethylene diisocyanate, as well as related aromatic and aliphatic isocyanates, which may also be substituted with other organic or inorganic groups that do not adversely affect the course of the chain-extending and/or cross-linking reaction.

Formation of the isocyanate terminated prepolymer is accomplished by reaction an excess of one of the preceding isocyanate components with a polyol having a relatively high molecular weight of between about 400-6000. In general, an NCO/OH equivalent ratio of 1 to 1.1:1 is preferred. Among the polyols useful in formation of the isocyanate terminated prepolymer are those selected from compounds based essentially on polybutadiene, castor oil, esters of castor oil or hydroxyl bearing polyethers or combination of them.

Suitable polyether polyols include aliphatic alkylene glycol polymers exemplified by polypropylene ether glycol and poly 1-4 butylene ether glycol. Also trifunctional compounds exemplified by the reaction product of trimethylol propane or glycerine with propylene oxide may be employed as the polyol constituents.

The polybutadiene based polyols are liquids that are founded on hydroxyl terminated liquid butadiene homopolymers and hydroxyl terminated butadiene copolymers with styrene.

In order to prepare the non-wicking casting system of the instant invention, the polyol containing the QUADROL is merely admixed with the isocyanate terminated prepolymer and the liquid mixture rapidly forms a gel which turns to a solid mass upon standing.

The non-wicking feature of the casting system is determined by placing the ends of a bundle of hollow-fibers into the liquid mixture before the mixture turns to a gel. The degree of wicking (capillary action) is determined by the distance the liquid mixture rises into the hollow-fibers before the liquid forms a gel.

By using the polyols containing QUADROL described above and mixing them with the previously described isocyanate terminated prepolymers, substantially non-wicking urethane systems are produced.

The cured polyurethane products of this invention are particularly useful for potting hollow fibers of fluid separatory devices employed for ultra-filtration, reverse osmosis and hemodialysis, etc. For instance, hollow fiber separatory devices are employed for dialysis, ultra-filtration, reverse osmosis, hemodialysis, hemoultrafiltration, blood oxygenation. In general, the separatory device consists of a plurality of fine hollow fibers whose end portions are potted in a tube-sheet and whose open fiber ends terminate in a tube-sheet face which provides liquid access to the interior of the fibers. The separatory elements are sealed within a casing to form a separatory cell having one or more liquid ports which allow for the passage of one fluid through the fibers and another around the fibers without mixing of the two fluids. The separatory element may have two tube-sheets or a single tube-sheet, in which latter case the fibers are doubled back so that all the ends terminate together. The general configuration of the separatory element and separatory cell is similar to a tube-and-shell heat exchanger. Patents representavie of the art of hollow fiber separatory devices include U.S. Pat. Nos. 2,972,349; 3,228,876; 3,228,877; 3,422,008; 3,423,491; 3,339,341; 3,503,515 and the like.

The tube-sheet material should fill the space between the hollow fibers and yet not deform them. Moreover, the cut edge of the hollow fibers must remain substantially circular after cutting. Further, it must be easy to handle and must fabricate into a strong unit. And, of course, it must be nontoxic when used in biomedical applications. The cured polyurethane product of the present invention is especially useful as a tube-sheet material.

In order to describe more fully the instant invention the following examples are presented.

EXAMPLE 1

In this example the prepolymer employed was prepared as follows:

204 grams of a 400 molecular weight polyoxypropylene glycol (0.966 eg), 205 grams of castor oil (0.599 eq) and 795 grams MDI (6.360 eq) were added to a reactor and flushed with nitrogen. The temperature was raised to 75° C. and maintained at 70°-80° C. for 2 hours. The resulting prepolymer had an NCO content of 16.7%.

272 grams of this prepolymer were mixed with 325 grams of castor oil and 3.6 grams of QUADROL at room temperature. The end of a bundle of hollow-fibers were inserted into the liquid mixture to a depth of 1 inch. The mixture formed a gel in 70 minutes and turned solid while standing overnight. Before forming the gel, the liquid rose 4.2 cm in the hollow-fibers, the height of the rise recorded as the amount of wicking.

The operational details and the results obtained are recorded in the Table.

EXAMPLES 2-4

In these examples the procedure of Example 1 was repeated except that various amounts of QUADROL were added to the polyol. Again, the details and results are recorded in the Table along with Control Run A which contained no QUADROL.

From the data, the degree of wicking is dependent upon the amount of QUADROL employed.

EXAMPLES 5-8

In these examples the prepolymer used was prepared by admixing 1530 grams (3 eq) of a 1000 molecular weight polyoxypropylene glycol, 2835 grams of a polymethylene polyphenylisocyanate (21 eq) having an isocyanate functionality of approximately 2.2, and 2.2 grams of benzoyl chloride in a reactor and flushed with nitrogen. The temperature was raised to 65° C. and maintained for 1.5 hours at 60°-70° C. The resulting prepolymer had an NCO content of 17.2%.

Various amounts of this prepolymer were mixed with polyoxypropylene triol (600 MW) containing various amounts of QUADROL. Upon immersing hollow-fibers in the mixture, the amount of wicking was determined and recorded in the Table along with Control Run B which contained no QUADROL.

EXAMPLES 9-12

The prepolymer used in these examples were formed by admixing 342 grams of castor oil (1 eq) and 1188 grams (9 eq) of a polymethylene polyphenylisocyanate having an isocyanate functionality of 2.7 in a reactor and flushed with nitrogen. The temperature was raised to 60° C. and maintained at a temperature of 60°-70° C. for 1.5 hours. The resulting prepolymer had an NCO content of 21.5%.

Various amounts of this prepolymer were mixed with castor oil containing varying quantities of QUADROL. The operational details and results obtained are also recorded in the Table along with those of Control Run C which contained no QUADROL.

From the above description and by the examples presented, it has clearly been shown that wicking may be held to a minimum when a polyol containing a QUADROL is admixed with an isocyanate terminated prepolymer as described above.

While this invention has been described and illustrated by the examples shown, it is not intended to be strictly limited thereto, and other variations and modifications may be employed within the scope of the following claims.

TABLE

| | \multicolumn{9}{c}{Wicking Study (Prepolymer eg/Polyol eq = 1.1/1)} | |
|---|---|---|---|---|---|---|---|---|---|---|
| | 1 | 2 | 3 | 4 | Control A | 5 | 6 | 7 | 8 | Control B |
| Prepolymer | Described in Example 1 | | | | | Described in Examples 5-8 | | | | |
| Polyol (Equiv.) | | | | | | | | | | |
| Castor Oil | 0.95 | 0.8 | 0.7 | 0.6 | 1.0 | — | — | — | — | — |
| PPG Triol (600 MW) | — | — | — | — | — | 0.95 | 0.8 | 0.7 | 0.6 | 1.0 |
| QUADROL | 0.05 | 0.2 | 0.3 | 0.4 | — | 0.05 | 0.2 | 0.3 | 0.4 | — |
| Mix Viscosity (cps) | 1250 | 1650 | 1960 | 2160 | 1150 | 760 | 990 | 1400 | 1720 | 700 |
| Gel Time (Min.) | 70 | 30 | 19 | 15 | 85 | 240 | 45 | 22 | 6 | 720 |

TABLE-continued

Wicking Study (Prepolymer eg/Polyol eq = 1.1/1)

| | | | | | | | | | | |
|---|---|---|---|---|---|---|---|---|---|---|
| Hardness-Shore D | 53 | 64 | 68 | 73 | 46 | 70 | 75 | 76 | 77 | 68 |
| Wicking (cm) | 4.2 | 2.3 | 1.4 | 1.2 | 9.5 | 16.4 | 6.1 | 2.8 | 1.2 | 20.3 |
| Type Urethane | CO/PE | CO/PE | CO/PE | CO/PE | CO/PE | PE | PE | PE | PE | PE |
| Eq. Ratio, Polyol/Quad | 95/5 | 80/20 | 70/30 | 60/40 | 100/0 | 95/5 | 80/20 | 70/30 | 60/40 | 100/0 |

| | 9 | 10 | 11 | 12 | Control C |
|---|---|---|---|---|---|
| Prepolymer | Described in Examples 9–12 | | | | |
| Polyol (Equiv.) | | | | | |
| Castor Oil | 0.95 | 0.8 | 0.7 | 0.6 | 1.0 |
| PPG Triol (600 MW) | — | — | — | — | — |
| QUADROL | 0.05 | 0.2 | 0.3 | 0.4 | — |
| Mix Viscosity (cps) | 1120 | 1260 | 1600 | 2000 | 970 |
| Gel Time (Min.) | 25 | 13 | 8 | 5 | 36 |
| Hardness-Shore D | 44 | 58 | 67 | 68 | 37 |
| Wicking (cm) | 6.2 | 2.1 | 1.2 | 1.0 | 9.1 |
| Type Urethane | CO | CO | CO | CO | CO |
| Eq. Ratio, Polyol/Quad | 95/5 | 80/20 | 70/30 | 60/40 | 100/0 |

CO = Castor Oil
PE = Poly Ether

It is claimed:

1. A hollow fiber separatory device capable of use in biomedical applications comprising a hollow fiber bundle consisting of a plurality of fine hollow fibers whose end portions are potted in a tube-sheet and whose open fiber ends terminate in a tube-sheet face, the resulting bundle being sealed within a casing to form a separatory cell having one or more fluid ports which allow for the passage of one fluid through the fibers and another around the fibers without mixing of the two fluids, said tube-sheet comprising a cured polyurethane composition comprising the reaction product of (1) a polyol mixture of (a) at least one polyol, and (b) N-N-N'-N'-tetrakis (2-hydroxypropyl) ethylene diamine, and (2) an isocyanate terminated polyurethane based prepolymer, said diamine being present in said polyol mixture in an amount sufficient to cause the viscosity of the urethane system to increase rapidly upon mixing of said polyol containing mixture and said prepolymer to form a gel which turns to a solid upon standing without markedly increasing the initial mix viscosity of the urethane system, thereby permitting placement of said urethane system and substantially reducing wicking of said urethane system after placement, said amount providing a ratio of equivalents of the N-N-N'-N'-tetrakis (2-hydroxypropyl) ethylene diamine to the polyol of from 5:95 to 40:60, and said polyol and said prepolymer being reacted in amounts to provide an NCO-OH equivalent ratio of about 1 to 1.1:1.

2. The device of claim 1 wherein the isocyanate terminated prepolymer is derived from an aromatic diisocyanate selected from the group consisting of 4-4'-diphenylmethane diisocyanate, polymethylene polyphenylisocyanate, 1,5-naphthalene diisocyanate and phenylene diisocyanate.

3. The device of claim 1 wherein the isocyanate terminated prepolymer is derived from a cycloaliphatic diisocyanate selected from the group consisting of 3-isocyanato methyl, 3,5,5-trimethylcyclohexyl isocyanate and 4,4'-methylene bis (cyclohexyl isocyanate).

* * * * *